Feb. 11, 1969  R. C. HANSON  3,427,542
MODULATION PRODUCT REJECTION CIRCUIT
Filed March 15, 1967
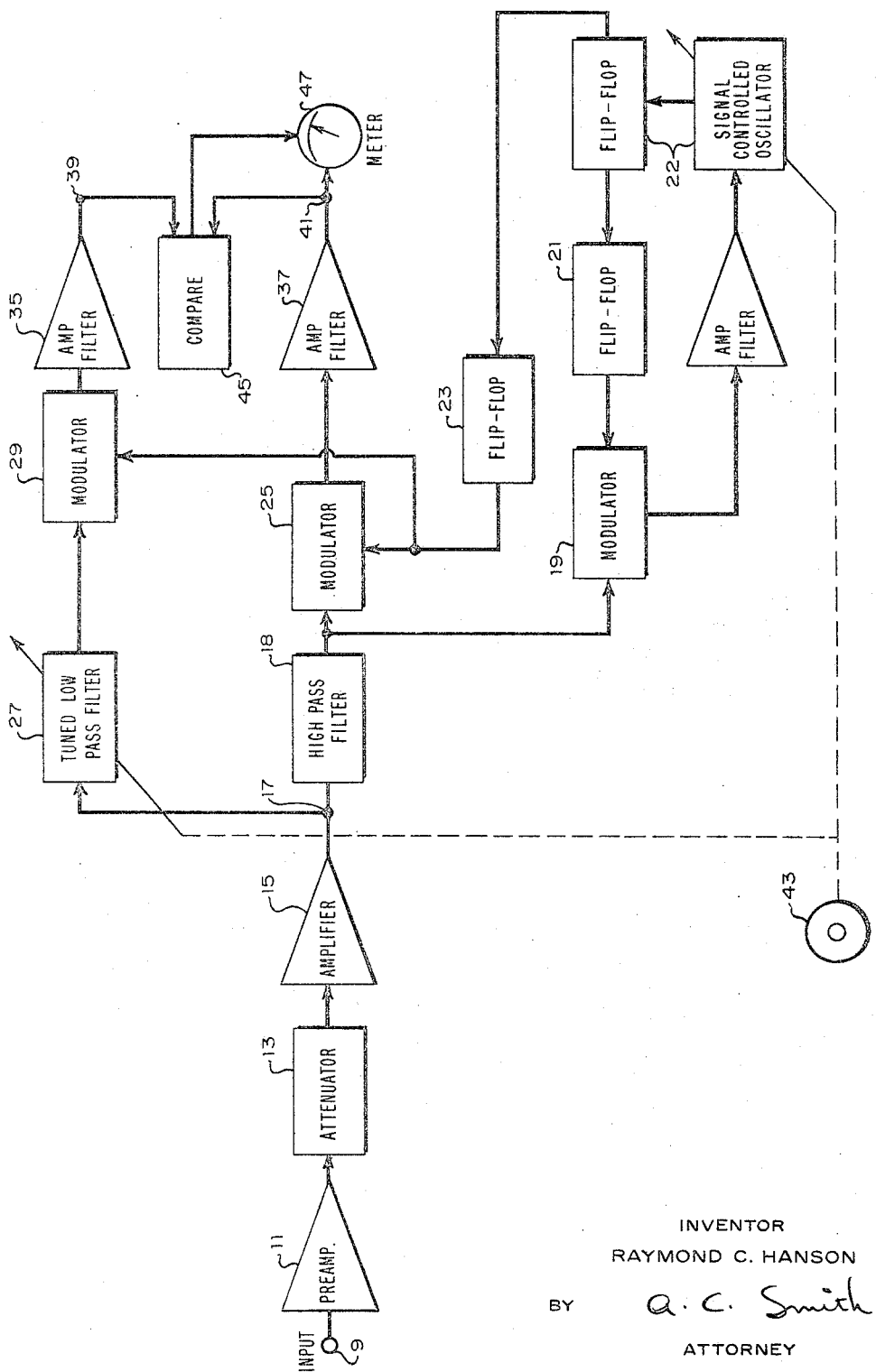
INVENTOR
RAYMOND C. HANSON
BY  Q. C. Smith
ATTORNEY 3,427,542
MODULATION PRODUCT REJECTION CIRCUIT
Raymond C. Hanson, Loveland, Colo., assignor to Hewlett-Packard Company, Palo Alto, Calif., a corporation of California
Filed Mar. 15, 1967, Ser. No. 623,260
U.S. Cl. 324—128      3 Claims
Int. Cl. G01r 23/00

ABSTRACT OF THE DISCLOSURE

A tuned voltmeter circuit includes a meter channel which provides an indication of signal amplitude at selectable frequencies and includes an inhibit channel which discriminates against undesirable harmonics to prevent meaningless meter indications.

Background of the invention

Certain known voltmeter circuits may be tuned to a selected signal frequency to provide an indication of the amplitude of the signal component at the selected frequency. However, when tuning the voltmeter circuit to determine the amplitude of a signal component at an unknown signal frequency the voltmeter circuit produces an undesirable indication on harmonically related signal frequencies.

Summary

In accordance with the illustrated embodiment of the present invention, a pair of signal channels each includes a modulator connected to receive the input signal and local oscillations which are phase-locked to the input signal. One of the channels includes a meter for producing an indication of the zero beat modulation product and the other channel includes a filter which cuts off at about the selected frequency of the local oscillators so that transmission of harmonics through this channel is attenuated below the level of signal transmitted through the other channel. This unbalanced signal transmission condition then prevents the meter from producing an indication.

Description of the drawing

The drawing is a block diagram showing the signal phase-locking circuit and the meter and inhibit signal channels each connected to receive the phase-locked local oscillations.

Description of the preferred embodiment

In the drawing, signal applied to the input terminal 9 is amplified by A.C. amplifier 11 and is applied through range attenuator 13 to the A.C. amplifier 15. The output 17 of the amplifier 15 is applied through high pass filter 18 to an input of modulator 19 which receives on its other input the output from the source 21, 22 of local oscillations. The output of modulator 19 is filtered and amplified and is applied as a D.C. signal to the source 22 to alter its frequency for maintaining phase lock between the source 22 and the signal at the input terminal 9.

The output 17 of amplifier 15 is also applied through high pass filter 18 to an input of modulator 25 in the meter channel and, through tunable low pass filter 27, to an input of modulator 29 in the inhibit channel. The remaining inputs of modulators 25 and 29 are connected to receive the local oscillations from source 22, 23.

The portions of the meter and inhibit channels following the modulators 25 and 29 are substantially similar and include amplifiers 35, 37 for supplying zero beat signals at the outputs 39 and 41.

When the frequency of the applied signal is unknown, the outputs 39 and 41 attain selected relative levels (say, approximately equal) while the dial 43 controlling the oscillation frequency of local source 22 is set to a value equal to the frequency of applied signal. This produces a zero-beat signal at output 41 with an amplitude related to the amplitude of the applied signal. At the same time, dial 43 controls the value of a circuit element in the tunable filter 27 such that its transmission characteristic is maximum approximately at the frequency of the applied signal. The amplitude of the zero-beat signal at output 39 thus attains a predetermined relationship to the amplitude of the zero-beat signal at output 41. The comparator 45 connected to receive and compare these outputs responds to the establishment of the predetermined relationship (say, parity or some selected unbalance) between the outputs 39, 41 and permits the meter 47 connected to output 41 to respond to provide an indication of the amplitude of the zero-beat signal at output 41.

When the setting of dial 43 corresponds to a harmonic relationship between the local oscillation frequency from source 22 and the frequency of applied signal, phase lock may be established and meaningless zero-beat signals may appear at the outputs 39 and 41. However, since the tuned filter 27 in the inhibit channel is set to have a peak transmission characteristic at another frequency than the input signal frequency, the output 39 will depart significantly from the predetermined relationship to the output 41. Comparator 45 responds to this condition to inhibit meter 47 from indicating the amplitude of output 41, for example, by simply controlling a relay which shorts the terminal of meter 47. Thus, as the dial 43 is adjusted to select or determine the unknown frequency of the applied signal, the D.C.-responsive meter 47 does not respond to the beat frequency which appears at output 41 in the absence of phase lock and does not respond to the zero-beat which appears at output 41 when phase lock is established on a harmonic relationship between the applied signal frequency or a signal component thereof and the local oscillation frequency. Rather meter 47 only responds to the zero-beat signal at output 41 while phase lock is properly established on the fundamental of the applied signal frequency and the outputs 39 and 41 attain the predetermined amplitude relationship.

I claim:
1. Signalling apparatus, comprising:
    an input terminal for receiving applied signal;
    a signal-controllable source of local oscillations;
    means connected to receive the local oscillations and the signal appearing at said input terminal for applying to said source a control signal representative of the phase relationship between the local oscillations and the signal appearing at said input terminal for controlling the frequency of said local oscillation to maintain phase lock between said local oscillations and signal appearing at said input terminal;
    first and second modulators each having an input connected to receive oscillations from said source;
    means including a filter having a selected signal transmission with frequency characteristic connected to apply signal appearing at said input terminal to another input of the first modulator;
    means connecting another input of the second modulator to receive signal appearing at said input terminal;
    circuit means responsive to a selected modulation product at the output of one of the first and second modulators and including an indicator for producing an indication of the magnitude of said selected modulation product; and
    comparator means connected to said circuit means and responsive to establishment of a predetermined rela- tionship between selected modulation products at the output of said first and second modulators for enabling said indicator to produce an indication and for inhibiting said indicator from producing an indication in the absence of said predetermined relationship between said selected modulation products.

2. Signalling apparatus as in claim 1 wherein:
said circuit means includes a D.C.-responsive meter operating as said indicator and said selected modulation products are the zero-beats.

3. Signalling apparatus as in claim 1 wherein:
said source of local oscillations is adjustable to produce oscillation over a range of frequencies; and
said filter includes an adjustable element which varies in circuit value with oscillation frequency to provide a frequency-selective signal transmission characteristic that varies over a range as the oscillation frequency varies.

References Cited

UNITED STATES PATENTS 2,914,670  11/1959  Boff _____ 328—139
3,177,442  4/1965  Halverson.

RUDOLPH V. ROLINEC, *Primary Examiner.*

A. E. SMITH, *Assistant Examiner.*

U.S. Cl. X.R.

324—77, 118; 328—139